No. 859,820. PATENTED JULY 9, 1907.
K. KNUDSEN.
ELECTRIC MOTOR WHEEL.
APPLICATION FILED OCT. 4, 1906.
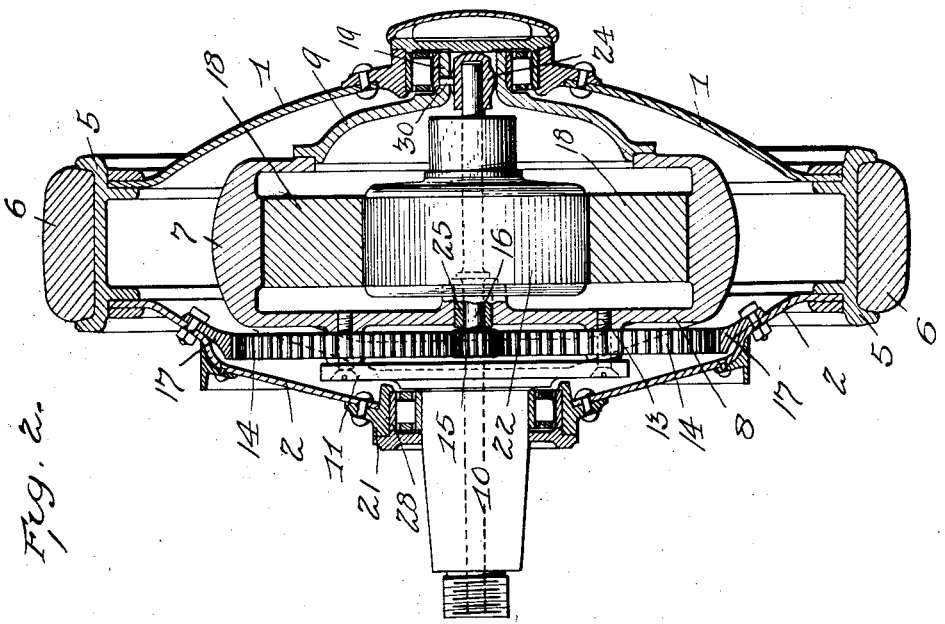
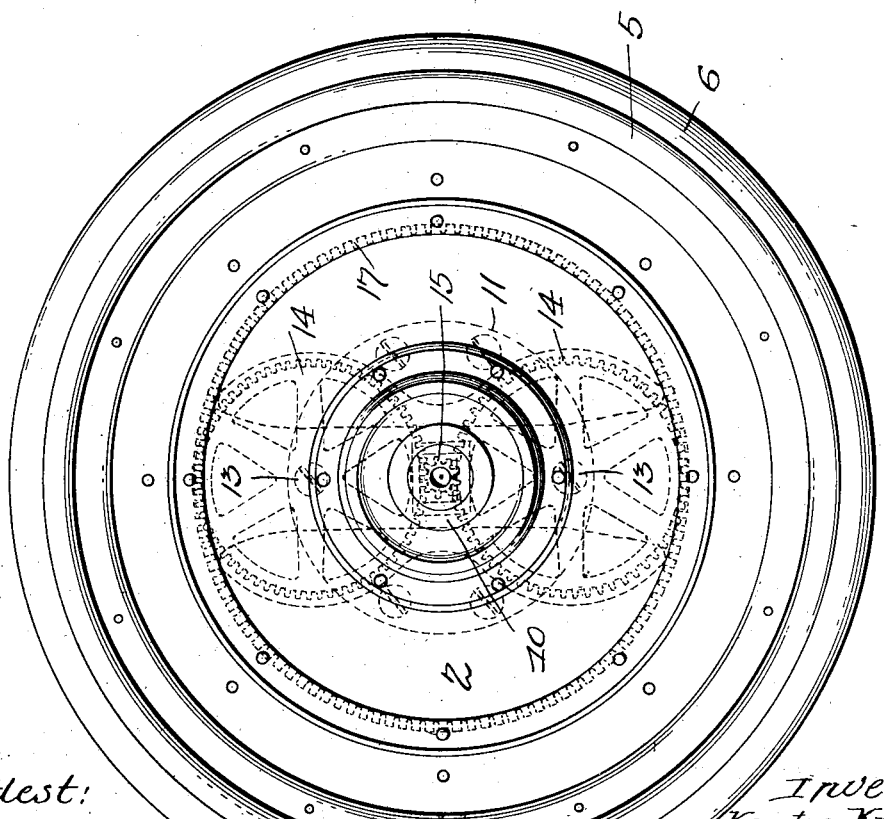
Attest:
C. S. Madden
Edward N. Sarton
Inventor
Karsten Knudsen
by
Smaldon & Spear
Att'ys

UNITED STATES PATENT OFFICE.

KARSTEN KNUDSEN, OF GRAND RAPIDS, MICHIGAN.

ELECTRIC MOTOR-WHEEL.

No. 859,820.   Specification of Letters Patent.   Patented July 9, 1907.

Application filed October 4, 1906. Serial No. 337,461.

*To all whom it may concern:*

Be it known that I, KARSTEN KNUDSEN, a citizen of the United States, residing at Grand Rapids, Michigan, have invented certain new and useful Improvements in Electric Motor-Wheels, of which the following is a specification.

My invention is an improvement in mechanism for communicating power from a rotary driving shaft, to a rotary wheel, especially applicable to an electrically driven vehicle wheel in which the motor is within the wheel or hub, and shown in that connection, but it is also applicable to other forms of wheels, used for other purposes.

In this invention I have combined with the wheel or hub, a single annular rack, and connected this rack with the driving pinion on the driving shaft at opposite points on said rack, whereby the strain and wear upon the parts are compensated for and balanced. I have shown the driving mechanism inclosed in the wheel, as better adapted thereto than to the narrow compass of the hub.

I have found that the motor shaft pinion geared to a rack on one side only, is impracticable, and I have also found that while a duplication of gears, one on each side of the motor shaft pinion, and engaging with the rack at opposite points, will balance the strain, yet this is not effective in practice, by reason of the difficulty of causing the gears to bear and work evenly upon the opposite sides of the annular rack, and I have found it necessary to introduce an element, which I have called an evener, whereby the opposite gears may be allowed to work with an effect, uniform and the same, on both sides. I have devised an evening device adapted to the conditions shown herein.

I have shown this device in connection with an electrically driven wheel, in which the motor is inclosed and acts through gearing upon a rack fixed to the wheel.

The construction of the wheel and the arrangement and supporting motor mechanism therein are hereafter shown and described, whereby a large air space is provided for the motor, where it may revolve without generation of excessive heat, and I have also shown a simple and effective construction of the parts.

My invention is illustrated in the accompanying drawings, in which,—Figure 1 shows a side elevation of a vehicle wheel, one embodiment of the invention. Fig. 2 shows a partial section taken transversely through the center of Fig 1.

In these drawings, the wheel comprises a shell formed of the disks 1 and 2 and a rim 5, and a tread or tire 6, used only when the wheel is designed for a vehicle.

The interior of the wheel affords an open clear space for the motor. Within this space is a hollow circular frame having a rim 7, a solid plain side 8 and a removable convex side 9, provided with an axially bored hub extension 19. The inner plain side of this frame is attached to and supported by a bar 11 which is rigidly attached to the axle extension or other support 10. The bar, which extends centrally across the frame, to equal distances on each side, is connected to said frame at two opposite points by bolts 13, on which also are mounted gears 14, on opposite sides, and meshing with a pinion 15, on the motor shaft 16, and also each meshing with an annular rack 17. This rack is provided with a flange which is bolted to the inner face of the wheel disk 2.

The bar which affords support for the gears and the frame which carries the field magnet 18 is fixed to the outer end of the axle extension, and the outer extension 19 of this frame forms an outer bearing for the wheel, and a support also for the outer end of the motor shaft 16.

The inner disk 2 has a central opening and at the edge of this is bolted a flanged ring 21 which is furnished with antifriction rollers bearing upon the hub extension. This ring with the roller cage 28 forms the inner hub end. The outer disk 1 has a like opening and flanged ring and roller cage which also carries similar rollers, bearing on the motor frame extension.

The shaft 16 of the revolving armature 22 carries a pinion fixed on its inner end and in engagement with the opposite sides of the two gears. This balances the strains, but I have found it essential in this construction to provide means for equalizing these strains upon the gears and rack. If all the parts are rigidly mounted, the strains and wear on opposite sides are unavoidably unequal.

I have provided a simple and effective equalizer in the bearings of the motor shaft. The outer bearing of this shaft is in a thimble 24 within the hollow frame extension. The inner bearing 25 is centrally arranged in a box upon the inner wall of the motor frame. The thimble 24 has an annular low rounded rib acting with its bearing like a ball and socket joint, and permitting some lateral motion of the shaft, a pin 30 serving to limit this movement of the thimble. The inner bearing 25 consists of a sleeve rectangular externally in cross section which rests in a corresponding opening in the frame boss, and large enough to permit some motion of the sleeve up and down, that is to say, in line at angles to a line extended through the pinion and the center of the gears.

It will be seen from the above that I have provided a construction and combination of parts by which a perfect couple action is secured, such construction or combination consisting essentially in a member to be driven carrying a rack, a pinion mounted in axial relation to the said member with gear connections between opposite sides of the pinion and opposite points of the rack and with equalizing means to secure a uniform transmission effect from the pinion to the said opposite points on the rack.

I do not limit myself to any particular form of gear connection between the pinion and the rack but have illustrated the planetary gears as the form best known to me for the purpose.

I claim:—

1. In combination, a member to be driven carrying an annular rack, a driving shaft mounted axially in relation to the member, a pinion thereon, connections between the opposite sides of the pinion and opposite points on the rack, said connections comprising gearing, and equalizing means, substantially as described.

2. In combination, a member to be driven, a driving shaft mounted axially in relation to the member, a pinion thereon, gearing between opposite sides of the pinion and opposite sides of the driven member and equalizing means, substantially as described.

3. In combination, a motor frame fixed to the axle extension or support and carrying on its inner periphery the field of an electric motor, a revolving magnet within said frame having its shaft bearings in the frame, a driven member inclosing the frame and having its hub bearings on said frame and on the extension to which it is attached, said member carrying an annular rack; a pinion on the motor shaft, a pair of gears mounted on the frame and connecting the pinion on opposite sides with the rack, and an equalizer interposed between the gears and motor, substantially as described.

4. In combination, a motor frame fixed to the axle extension or support and carrying on its inner periphery the field of an electric motor, a revolving magnet within said frame having its shaft bearings in the frame, a member to be driven and inclosing the frame and having its hub bearings on said frame and on the extension to which it is attached, said member carrying an annular rack, a pinion on the motor shaft, a pair of gears mounted on the frame and connecting the pinion on opposite sides with the rack, and an equalizer consisting of movable bearings on the motor shaft, substantially as described.

5. In combination with a member carrying a rack, an electric motor mounted axially within said member, a pair of gears connecting the pinion of the motor shaft on opposite sides with the rack, and an equalizer interposed between the rack and the motor shaft, substantially as described.

6. In combination, a member to be driven carrying an annular rack, a driving shaft mounted axially within the member carrying a pinion, gears mounted on opposite sides of the pinion and connecting with the rack and an equalizer for said pinion, substantially as described.

7. In an electric motor wheel or the like to be driven, a motor shaft carrying a pinion, oppositely placed gears connecting said pinion with an annular rack, and an equalizer, consisting of a laterally movable bearing at the pinion end of the shaft, and a pivoted bearing at the other end, substantially as described.

8. In combination, a motor, a pair of compensating gears, an equalizer connecting them, and a third geared member meshing with both compensating gears, said equalizer being independent of the transmission of power from said motor to the geared members, substantially as described.

9. In combination, a motor, a pair of compensating gears, an equalizer connecting them, and transmission gearing between the said compensating gears, said equalizer being independent of the transmission of power from said motor to the geared members, substantially as described.

In testimony whereof I affix my signature in presence of two witnesses.

KARSTEN KNUDSEN.

Witnesses:
F. H. CLARKE,
M. B. CHURCH.